(12) United States Patent
Demergasso et al.

(10) Patent No.: US 7,422,687 B2
(45) Date of Patent: Sep. 9, 2008

(54) BIOTREATMENT OF AS-CONTAINING HYDROXIDE SLUDGE

(75) Inventors: Cecilia Demergasso, Antofagasta (CL); Pedro Galleguillos Pérez, Antofagasta (CL); Victor Zepeda Álvarez, Antofagasta (CL); Lorena Escudero, Barcelona (CL)

(73) Assignee: Universidad Catolica del Norte, Antofagasta (CL)

( * ) Notice: Subject to any disclaimer, the term of this patent is extended or adjusted under 35 U.S.C. 154(b) by 0 days.

(21) Appl. No.: 11/769,388

(22) Filed: Jun. 27, 2007

(65) Prior Publication Data

US 2008/0000831 A1  Jan. 3, 2008

(30) Foreign Application Priority Data

Jun. 27, 2006  (CL) ................................. 1645-2006

(51) Int. Cl.
*C02F 3/00* (2006.01)

(52) U.S. Cl. ...................... 210/609; 210/610; 210/611; 210/742

(58) Field of Classification Search ................ 210/609, 210/610, 611, 742
See application file for complete search history.

(56) References Cited

U.S. PATENT DOCUMENTS 6,387,669 B1 * 5/2002 Truex et al. ................. 435/168

OTHER PUBLICATIONS

Galvin. "Hydroxide Sludge Management." *Ingenieria Quimica*. Jun. 1998. pp. 173-178.

Catica et al. "Abatement of Turbidity and Color in Conventional Plants Under Altiplanic Winter Condition." *XIII Chilean Congress on Sanitary and Environmental Engineering*. Oct. 1999.

Slater et al. "Disposal of Waterworks Sludge: Final Report of Research Panel No. 14." *Panel from Engineering Subcommittee of the Joint Research Steering Committee of the Institute of Water Engineers and the Society for Water Treatment and Examination*. Oct. 1973. pp. 399-409.

Undebarrena. "Thermal Dehydration of Sludge in the Industrial Field." *Tratamiento de Lodos*. Jun. 1999.

Coates et al. "Microbial Perchlorate Reduction: Rocket-Fuelled Metabolism." *Nature Reviews/Microbiology*. vol. 2. Jul. 2004. pp. 569-580.

* cited by examiner

*Primary Examiner*—Chester T. Barry
(74) *Attorney, Agent, or Firm*—Merchant & Gould P.C.

(57) ABSTRACT

The invention discloses a biotechnological process for the treatment of hydroxide sludge containing As produced in potable water production processes which use $FeCl_3$ as a coagulant. The process seeks to modify the physicochemical properties of the produced sludge in such a way to facilitate the use of mechanical dehydration methods that allow decreasing the sludge volume and facilitating its final disposal. The process entails: Preparation of an inoculum of sulfate reducing microorganisms from the sludge to be treated; Combining the sludge to be treated, the SRB inoculum, and nutrients at a controlled temperature for about 5 days in an anaerobic reactor with enough mixing to allow sludge homogenization such that no untreated zones remain; Decanting the treated sludge for a period of approximately 3 days, recovering the clarified liquid and subjecting the sediment to a dewatering process through filtration or centrifugation; Filtering the solid residue coming from the decanter; and Characterizing the final residue.

8 Claims, 4 Drawing Sheets

Figure 1:
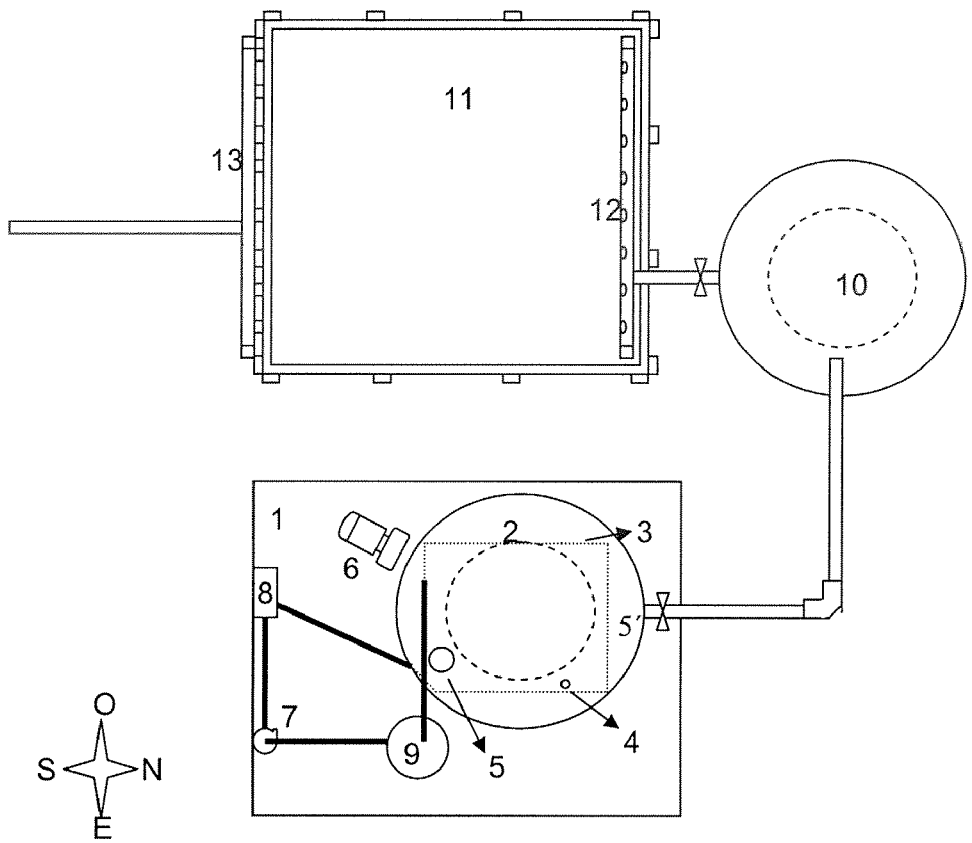

Humidity percentage of sludge in bed filter

BIOTREATMENT OF AS-CONTAINING HYDROXIDE SLUDGE

SUBJECT OF THE INVENTION

The present invention reveals a biotechnological process for the treatment of As-containing hydroxide sludge resulting from potable water treatment processes, which use $FeCl_3$ as a coagulant, through the action of sulfate reducing bacteria.

STATE OF THE ART

Urban residual water treatment has undergone important progress during the last decades. Research on the effects of contaminants, more strict environmental regulations and economic factors have propelled the development of new technologies, being the main challenge waste minimization.

Hydroxide sludge resulting from physicochemical sedimentation of water in potable water treatment plants has minor content of organic matter and an important amount of water. Its characteristics will depend on physicochemical properties of raw water to be treated as well as the chemical reactants added to the water (Marin, G. R. (1998). "Gestión de lodos hidróxido." *Ingeniería Química:* 173-178).

In the majority of water treatment plants, the physicochemical process of coagulation is oriented to reduce, as much as possible, suspension matter, color and turbidity of natural water.

In arsenic abatement plants, in comparison with turbidity treatment plants, the dosage of coagulant is higher in comparison to plants designed for particulate material reduction in fresh water (dosage between 40.5-56.1 ppm $FeCl_3$). According to Slater equation (G., 1973. Disposal of waterworks sludge: Final Report of Research Panel, n° 14. Institution of Water and Environmental Management 27 (8): 399-408), this treatment also produces a larger amount of sludge mass in dry matter per treated raw water volume unit, compared to particulate material abatement plants. The increase in sludge volume produced makes difficult its final disposal. Also, it is worth to note that the presence of arsenicated sludge makes it a dangerous waste.

The first operation in the treatment of hydroxide sludge is thickening, which is carried out in a gravity thickener, or also in floating thickeners. From the thickening process sludge with a solid concentration between 2% and 8% and a clear effluent result. After thickening, the sludge is subjected to a dehydration process. The processes used for this aim are mechanical dehydration processes, like centrifugation and filtration systems (press filters, band filters or vacuum filtration) able to increase the solid content in waste to values around 25 to 30%. The disadvantage of these methods is that an important amount of humidity is still being disposed, thus creating an excess of volume in the disposal process, an increase in lixiviates and increased costs in transport and disposal.

Use of mechanical dehydration processes for treatment of sludge coming from decanter tanks depends on the volume and characteristics thereof, where determinant parameters are amount and decantability, specific resistance to filtration and compressibility coefficient.

There are drying systems whose adaptation to industrial processes entails a series of difficulties. Heat drying of sludge consists on direct or indirect contact of sludge with gases at high temperature to reduce the humidity content to 10% as a minimum. Direct drying is appropriate for easily disaggregating products, but is complicated when an amorphous, very humid mass with plastic characteristics impeding its disaggregation is to be treated (Undebarrena, M. (1999). "Tratamientos de lodos: Deshidratación térmica de lodos en el ámbito industrial." *Ingeniería Química:* 99-102). On the other hand, it requires vast areas in relation to the sludge volume for drying to facilitate heat penetration and water transport to the drying surface.

The developed biotechnological treatment process seeks to modify the physicochemical properties of the produced sludge in such a way to facilitate the use of mechanical dehydration methods that allow decreasing the sludge volume and facilitating its final disposal.

Anaerobic Systems for Treatment of Residual Waters

The developed process is based on the action of sulfate reducing bacteria (SRB) on the hydroxide sludge (which have minor content of organic matter and important amounts of associated water) to which an electron acceptor is added, for example sulfate, a source of carbon such as ethanol and a vitamin supplementation, for example yeast. The reactor of the invention should help to reduce the presence of oxygen in the system since sulfate-reducing bacteria are anaerobic.

Anaerobic digestion is used in treatment of residual waters with high organic charge (2,000 to 30,000 or more BOD/l), as in the case of aromatic hydrocarbon contaminated waters (Coates, J. D., Achenbach, L. A., 2004. Microbial perchlorate reduction: rocket-fueled metabolism. Nat Rev Microbiol 2 (7): 569-80). These concentrations are present in many residues, such as food and agriculture industries. In this process, colloidal and soluble organic matter is transformed into volatile acids, which in turn are transformed into methane and carbon dioxide. Different kinds of bacteria produce either acid or methane fermentations. The produced gases contain 65% of $CH_4$, which allows taking advantage of it to keep a suitable temperature for digestion, around 37° C., and counting on an energy surplus, depending on the characteristics of the residual water.

Sulfate Reducing Bacteria

Sulfate is used as an electron acceptor in anoxic conditions by a set of heterogeneous bacteria using fatty acids, alcohols and hydrogen as electron donors. Sulfate reducing bacteria (SRB) can be considered as a unified handful of bacteria using lactate, pyruvate, ethanol and certain fatty acids as carbon and energy sources, reducing sulfate to hydrogen sulfide. Other known group of bacteria is specialized in oxidation of fatty acids, particularly acetate, reducing sulfate to sulfide. Anoxic techniques have to be used to culture reducing bacteria since they are anaerobic.

Sulfate reducing bacteria are vastly distributed in aquatic and terrestrial environments, which become anoxic due to certain microbial decomposition processes.

Bacteria responsible for sulfate dissimilatory reduction include *Desulfovibrio* and *Desulfotomaculum*. Both bacteria require anoxic conditions for its respiratory processes and use of sulfate and other sulfur oxidized compounds (e.g., $SO_3^{2-}$, $S_2O_3^{2-}$) as electron acceptors.

Description of the Technical Problem Solved

In the treatment and water recovery systems, it is required to purge the sludge from the storing tank of disposal waters. This sludge has a solid content lower than 1%. The characteristics of the produced sludge and its volume make it difficult the use of mechanical dehydration techniques such as centrifugation and filtration systems. The arsenic content in the sludge, on the other hand, prevents its treatment as nondangerous sludge produced in water treatment plants, which are normally disposed into a municipal sewer system, public continental channels or seawater. Present regulations consider as dehydrated sludge for transport and final disposal those with a humidity percentage of 70% or lower.

Water contamination becomes very important in the need to preserve the environment, since contaminants can be accumulated and transported through streams, rivers, lakes, dams and underground waters, directly affecting human health and wildlife. The most important sources of surface and underground water contamination are industrial and urban wastewaters.

Sludge disposal is a problem in the control of contamination in the form of air, water and ground pollution due to solid, liquid and gas emission generated from productive processes.

The process of the invention to treat arsenicated sludge allows obtaining a residue whose characteristics comply with environmental laws, namely:

The solid residue obtained as final product has a water content lower to 50%.

It is stable in lixiviation assays.

Has a slightly higher density than raw sludge, which represents an advantage to the possible wind dispersion effect.

The quality of the recovered water is within the limits allowed by Chilean law for irrigation or final disposal into sewer systems or into seawater and continental surfaces.

The application of the developed treatment process reduces:

Volume of industrial waste with arsenic to be disposed securely.

Costs of transport.

Area required for disposal.

Contamination risks.

The efficiency of the process of potable water production is increased by the technology developed, recovering more than 50% of the water, which is currently discarded.

The revealed process in the present invention allows reducing costs in the stage of dewatering and dehydration of sludge coming from potable water production processes, thus giving stability characteristics to the solid residues which will have to be finally disposed in a secure way.

FIGURE DESCRIPTION

FIG. 1. General diagram of installations for treatment of hydroxide sludge coming from a potable water production process using fluvial water as source with $FeCl_3$ as a coagulant.

Figure 2:
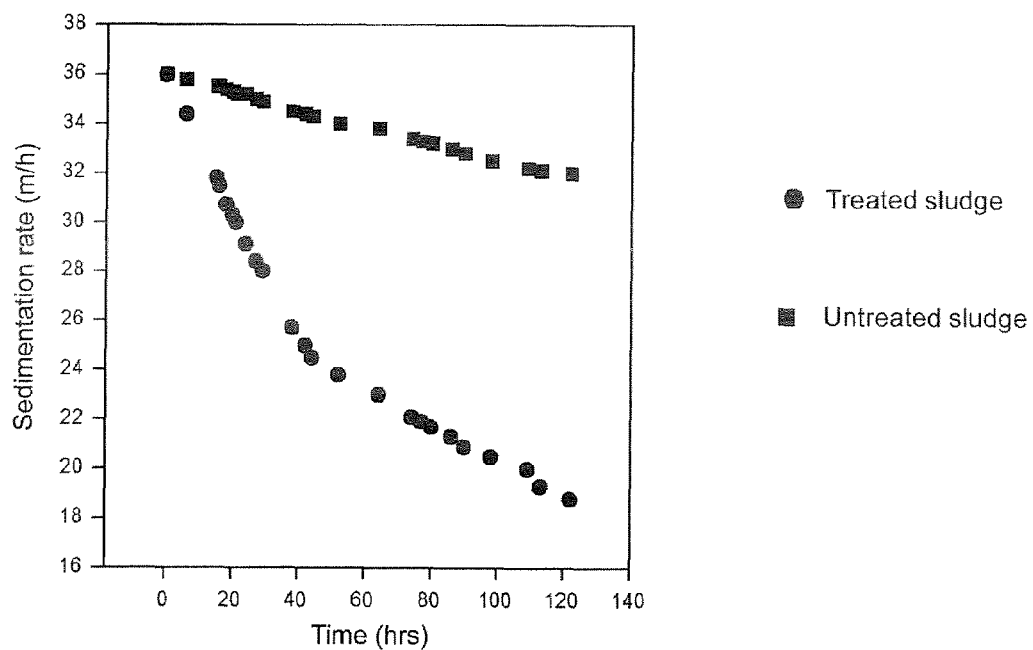

Description:
 1. Bioreactor hut 2.9 m×3.4 m×2.5 m
 2. Bioreactor
 3. Internal squared coil
 4. Thermocouple
 5. 5'. Charge inlet and outlet, respectively
 6. Centrifugal pump for sludge recirculation
 7. Centrifugal pump for coil water
 8. Heater
 9. Water tank
 10. Decanter
 11. Squared bed filter
 12. Sludge distributors
 13. Filtered water recollection nozzles FIG. 2. Test tube sedimentation plot: allows comparison of characteristics between treated and untreated sludge. In this plot, sludge treated with the present invention process present a higher sedimentation rate than raw sludge, favoring solid residue and residual water separation.

Figure 3:
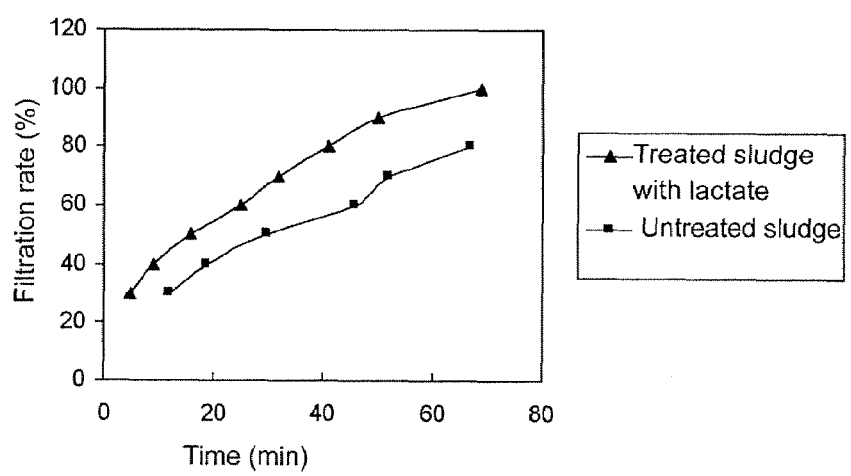

FIG. 3. Paper filtration at atmospheric pressure plot: allows comparison between treated and untreated sludge. In this plot, treated sludge shows a significantly increased filtration rate favoring the dewatering process of these residues.

Figure 4:
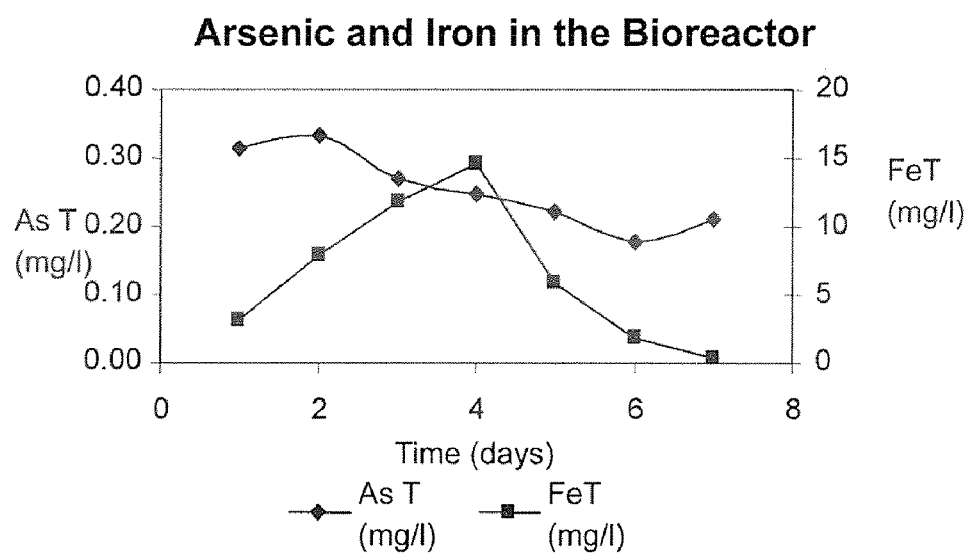

FIG. 4. Total arsenic and iron concentrations in supernatant during a bioreactor test. In this plot, total arsenic and iron concentration in supernatant decrease by the end of treatment due to precipitation caused by bacterial action. These results show the advantage of the process with respect to residual water production, which can be used as irrigation water, according to Chilean regulations.

Figure 5:
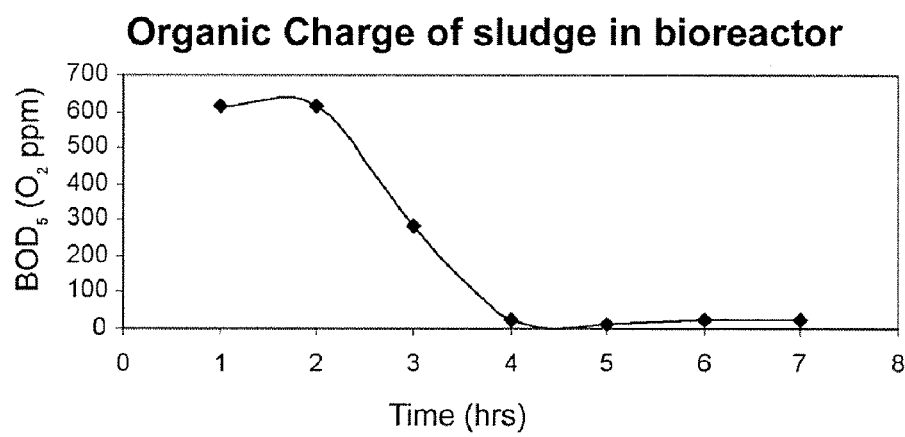

FIG. 5. Organic matter analysis in sludge over time. Organic matter decrease over time is expressed as $BOD_5$. These results show that organic matter supplemented to the bioreactor is enough and is consumed almost completely during sludge treatment in bioreactor. The presence of organic matter in the solid residue would generate a new problem for these residues.

Figure 6:
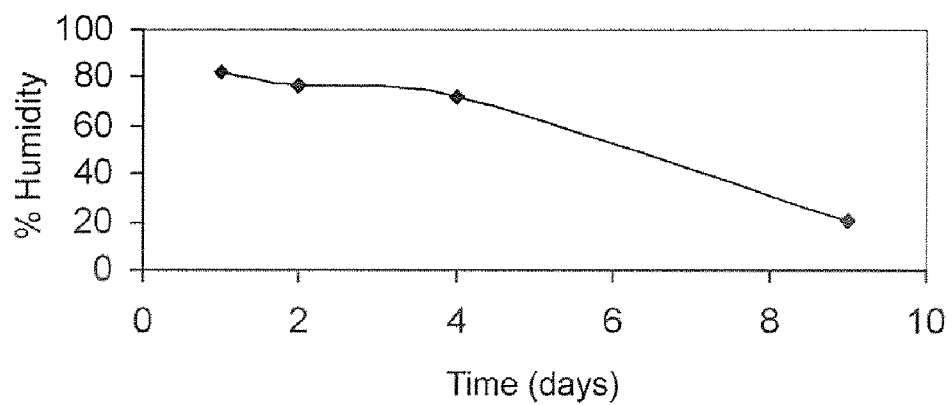

FIG. 6. Sludge humidity percentage decrease in bed filter. This plot shows that 20% water content in the solid residue is reached in 9 days. Hence, drying times and water content of the solid residue for final disposal are decreased.

DESCRIPTION OF THE INVENTION

The developed process is based on the action of sulfate reducing bacteria (SRB) on hydroxide sludge with an electron acceptor added such as sulfate, a carbon source such as ethanol and a vitamin source such as yeast.

Sulfate reducing bacteria are anaerobic; hence the process is carried out in a reactor ensuring a reduced presence of oxygen, temperature control adequate for bacterial action and proper mixing to obtain a homogeneous product.

The process of the present invention comprises the following stages:

a.—Preparation of Sulfate Reducing Microorganisms (SRB)

Biological material used as an initial inoculum in the process is obtained through selective enrichment of the microbial population present in the same sludge to be treated. This sludge is composed by sulfate reducing microorganisms.

Microbial enrichment is performed by incubating raw sludge for 7 days with nutrients added (ethanol, yeast and sodium sulfate) and with no inoculum addition. Nutrient concentrations are as follows: 0.01 to 1.0 g/l ethanol, 0.01 to 1.0 g/l yeast and 0.01 to 0.5 g/l sodium sulfate. Incubation is performed at 15 to 32° C.

Microbial enrichment is assessed through the capacity to perform an efficient sludge treatment by reducing sludge volume and favoring dewatering.

An initial inoculum volume of 10% the volume of the bioreactor is prepared for the initial process.

10% of the previous treated sludge is left in the bioreactor as an inoculum for successive batches.

Biological material isolated from treated sludge is characterized in Iverson and Newman solid mediums. Culture independent methods based on analysis of 16S rRNA for identification of microorganisms responsible for the process are also used.

For a specific sludge source, successive enrichment processes will raise a bacterial population composed by sulfate reducing bacteria, fermentative bacteria and bacteria able to precipitate arsenic such as $As_2S_3$.

b.—Combination of the Sludge to be Treated, the Inoculum Obtained in Stage (a) and Nutrients in the Bioreactor Sludge to be treated with an approximate solid content between 1,500 and 3,000 mg $L^{-1}$, nutrients (0.01 to 1.00 g/l ethanol, 0.01 to 1.0 g/l yeast and 0.01 to 0.5 g/l sodium sulfate) and an inoculum with a volume equal to 5 to 30% of the total reactor volume are placed in an anaerobic reactor with mixing, temperature control and a manometer.

The system is started up with temperature control between 15 and 32° C. Mechanical mixing is provided to allow sludge homogenization in such a way that no untreated zones remain. Mixing should be gentle to allow higher density granule formation.

Residence time of sludge in the bioreactor is from 4 to 7 days.

c.—Treated Sludge Sedimentation

Treated sludge is subjected to sedimentation in a decanter. The sedimentation stage has a duration of approximately 3 days.

The clarified liquid is recovered and the sediment is then subjected to a dewatering process through filtration or centrifugation.

The sedimentation process allows up to 70% recovery of clarified water with arsenic and iron concentrations of 0.3 and 3.69 mg/l respectively.

d.—Solid Residue from Decanter Filtration

Solid residues from sedimentation stage are transferred to a bed filter to recover up to 11% of water and obtain the final residue.

e.—Final Residue Characterization

Solid residue water content, density, As, Fe and organic matter content are analyzed. Lixiviation assays to analyze residue stability are also performed following, for example, the EPA method 1311 "Determination of toxicity through lixiviation procedure". The solid residue is ready to be transported to the definitive disposal site.

On the other hand, As, Fe, total solids, turbidity and fecal coliform populations in the recovered filtered water are analyzed. According to the recovered water characteristics, said water could be used for irrigation and/or released into surface water streams.

APPLICATION EXAMPLE

Hydroxide sludge coming from potable water production from fluvial water using $FeCl_3$ as a coagulant was treated with the process of the present invention.

An inoculum was prepared in 6 20-liter drums with a 7 liter culture obtained through selective enrichment of microbial populations present in the sludge to be treated. Initial enrichment was prepared incubating the sludge to be treated (500 ml) in anaerobic conditions at 28° C. with added nutrients (0.82 g/l ethanol, 0.5 g/l yeast extract and 0.25 g/l sodium sulfate). Successive subcultures with larger volumes, using the same conditions, allowed obtaining 7 liters of culture to inoculate the first drum.

A 20-liter drum was filled with sludge, nutrients, ethyl alcohol (0.82 g/l), sodium sulfate (0.5 g/l) instant yeast (0.25 g/l) and 7 liters from the initial enrichment were added. The drum was incubated at room temperature for 7 days.

At the end of the week, half the content of the drum was transferred to a new drum, and corresponding amounts of substrates were added (ethanol, sodium sulfate and yeast) to each drum and enough sludge to fill the drums completely. The procedure was repeated until 400 liters necessary to inoculate the reactor were obtained.

The volume added to the bioreactor (400 l) was 10% of the total capacity of the bioreactor. In subsequent cycles, 10% of the treated sludge was left as an inoculum for the new batch.

A suitable reactor to perform the anaerobic process of the present invention was designed. The reactor comprises a discontinuous mixer system (6), which is basically a pump withdrawing sludge from one zone of the reactor and pumping it into another zone. A coil (3) with water heated in a waterheater (8) circulating through it propelled by a pump (7) was used to keep a constant temperature inside the reactor. The tank walls and bottom were coated on their outside with 2.5 cm of glass wool as an insulator (for a 10 $m^2$ area). The system is completed with a bottom inlet and outlet (5 and 5') and manometers. A 5 $m^3$ resin-covered fiberglass tank was used for the anaerobic bioreactor construction. The bioreactor was installed in a hut prepared for this goal. Temperature was registered with a thermocouple (4). When temperature inside the reactor fell below 30° C., the heating system was turned on.

Mixing was performed through mechanical pumping of sludge through external recirculation ducts using a centrifugal pump (1,700 l/min). Fiberglass was used to construct 4 baffles with the following size: 19 cm wide and 1.7 m height.

Proper connections were made for sludge feeding from the water recovery tank and sludge drainage from bioreactor to the decanter.

The manometer was installed to control the possible production of $H_2S$ due to bacterial sulfate reducing activity.

The reactor was installed 3 m above the ground to facilitate sludge discharge to the decanter placed at ground level. The reactor was installed above the discarded water recovery tank.

The bioreactor was fed with sludge, designated as "raw sludge", which was extracted using a submersible pump from the discarded water tank. The solid content of raw sludge was 2,500 mg/l. The following nutrients were added: 0.5 g/l yeast, 0.25 g/l sodium sulfate and 0.16 g/l ethanol.

The sludge residence time was 7 days with a daily mixing period of 1 hour. The temperature inside the bioreactor was kept at 30° C.

The treated sludge was transferred to the decanter by means of the level difference. Fiberglass was used to build the 5 $m^3$ tank for sludge sedimentation.

All connections needed for extracting sludge from the bioreactor and sludge transferring to bed filter and recovery of clarified water were made.

The sedimentation rate was evaluated at the end of the test in the bioreactor. Measurements were made in test tubes obtaining a curve of interface height vs. time. Using Talmage and Fitch method, 1955 (Talmage, W. P., and Fitch, E. B., 1955, Determining thickener unit areas, Ind. Eng. Chem., Vol. 47, No. 1, pp. 38-41), and using the system of tangents to the obtained curve, sedimentation rate was determined to be 0.0560 m/h.

The sedimentation stage has a duration of 2 days after the transfer of treated sludge from the bioreactor to the decanter. Once sedimentation has finished, clarified water is withdrawn through the upper part of the tank using a submersible pump and the treated sludge is transferred to the bed filter.

Solid content of sediment and recovered water characteristics were analyzed.

The solid content obtained in the decanter is shown in Table 1.

TABLE 1

Sludge solid content in the bioreactor and decanter.

| Sample | ST (mg/L) |
|---|---|
| Raw sludge in bioreactor inlet | 2.645 |
| Treated sludge in bioreactor outlet | 2.925 |
| Clarified water from decanter | 1.759 |
| Treated sludge decanter outlet | 9.734 |

70% of clarified water was recovered with arsenic and iron concentrations of 0.30 and 3.69 mg/l respectively.

Solid sediment residues are transferred to the bed filter using level difference. A 7.84 m² wood polyethylene coated bed filter (11) was constructed with three filtering layers. The first layer is composed of quartz (2 m³), the following layer is composed of a mix of quartz and sand (2 m³) and the final layer is composed of fine sand (1 m³). The height difference between the decanter (10) and the bed filter allows the transfer of sludge using sludge distributors (12) with no need of pumps. Filtered water percolate is drained through nozzles (13).

Around 11% of water from the bed filter was recovered, with arsenic and iron concentrations of 0.068 and 0.04 mg/l respectively, a turbidity of 195 NTU and 40 mg/l average total solids. The content of fecal coliforms in filtered water was around 200 to 1,000 CFU/100 ml.

After nine days of filtration and evaporation, the solid residue had a humidity of 20% and was stable in lixiviation assays performed according to method 1311 "Determination of toxicity through lixiviation procedure, EPA" (Table 2). Dry treated sludge has a slightly higher density than dry raw sludge (Table 3), suggesting an advantage when taking into account the possible dispersion due to wind. Average composition in dry base was 14.5 g/kg As, 240 g/kg Fe and 30 g/kg organic matter.

TABLE 2

As and metal concentration in lixiviation solutions of final product

| Sample | Time (days) | As (ppm) | Fe (ppm) | Mn (ppm) | Mg (ppm) |
|---|---|---|---|---|---|
| Raw sludge | 0 | 0.545 | <0.03 | 1.185 | 5.505 |
| Raw sludge | 14 | 0.038 | 0.093 | 13.300 | 15.250 |
| Treated sludge | 0 | 1.365 | 0.042 | 0.960 | 2.025 |
| Treated sludge | 14 | 0.068 | 0.078 | 9.550 | 8.050 |

Chilean regulation establishes a maximum of 5 mg/l As in lixiviates.

TABLE 3

Density determination of sludge results in mg/ml determined by picnometry.

| | Treated sludge | | |
|---|---|---|---|
| density | 2.4062 | 2.6506 | 2.4117 |
| | average | 2.4895 | |
| | Raw sludge | | |
| density | 2.0429 | 2.0969 | 2.0211 |
| | average | 2.0536 | |

Results in Table 3 show the increase in density of treated sludge compared to raw sludge. This increase is an additional advantage of the final product compared to the raw sludge since wind dispersion is more difficult.

The invention claimed is:

1. A biotechnological process for the treatment of hydroxide sludge containing As resulting from potable water production processes which use $FeCl_3$ as a coagulant, through the action of sulfate reducing bacteria, wherein said process comprises:
   a. preparing a sulfate reducing microorganism (SRB) culture for the process, said culture coming from the same sludge to be treated;
   b. combining in an anaerobic bioreactor and for an approximate period of 5 days, the sludge to be treated, the inoculum obtained in (a) and nutrients such as ethanol, sulfate and yeast, at a controlled temperature and with enough mixing to allow sludge homogenization in a way that no untreated zones remain;
   c. decanting the treated sludge, for a period of approximately 3 days, recovering the clarified liquid and subjecting the sediment to a dewatering process through filtration or centrifugation;
   d. filtrating the solid residue coming from the decanter; and
   e. characterizing the final residue.

2. The biotechnological process of claim 1, wherein the biological material, used as the initial inoculum for the process, comprising sulfate reducing microorganisms, is obtained by selective enrichment of the microbial population of the same sludge to be treated.

3. The biotechnological process of claim 1, wherein the nutrients used in (b) are ethanol, yeast and sodium sulfate.

4. The biotechnological process of claim 3, wherein said nutrients are within the following ranges: ethanol from 0.01 to 1.0 g/l, yeast from 0.01 to 1.0 g/l and sodium sulfate from 0.01 to 0.50 g/l.

5. The biotechnological process of claim 1, wherein the temperature in (b) is kept in the range from 15 to 32° C.

6. The biotechnological of claim 1, wherein the sludge residence time in the bioreactor in (b) is from 4 to 7 days.

7. The biotechnological of claim 1, wherein the solid residue from the sedimentation process is transferred to a bed filter for water recovery and to obtain the final residue.

8. The biotechnological process of claim 1, wherein the sulfate reducing microorganism culture comprises *Desulfovibrio* bacteria, *Desulfotomaculum* bacteria, or a combination thereof.

* * * * *